United States Patent
Venkatesan et al.

(10) Patent No.: US 7,587,605 B1
(45) Date of Patent: Sep. 8, 2009

(54) CRYPTOGRAPHIC PAIRING-BASED SHORT SIGNATURE GENERATION AND VERIFICATION

(75) Inventors: Ramarathnam Venkatesan, Redmond, WA (US); Dan Boneh, Palo Alto, CA (US); Peter L. Montgomery, Bellevue, WA (US); Victor Boyko, Brooklyn, NY (US)

(73) Assignee: Microsoft Corporation, Redmond, WA (US)

( * ) Notice: Subject to any disclaimer, the term of this patent is extended or adjusted under 35 U.S.C. 154(b) by 695 days.

(21) Appl. No.: 10/804,835

(22) Filed: Mar. 19, 2004

(51) Int. Cl.
 *H04L 9/16* (2006.01)
 *H04L 9/28* (2006.01)
(52) U.S. Cl. ..................... 713/180; 380/30
(58) Field of Classification Search ......... 713/179–180; 380/42–44, 46–47, 262–263, 268
See application file for complete search history.

(56) References Cited

OTHER PUBLICATIONS

Chen, Liqun et al."Identity Based Authenticated Key Agreement Protocols from Pairings." Proceedings of the 16th IEEE Computer Security Foundations Workshop(2003).*

Tsujii, Shigeo et al."An ID-Based Cryptosystem Based on the Discrete Logarithm Problem." IEEE(1989).*

Eisentrager et al., Improved Weil and Tate Pairings for Elliptic and Hyperelliptic Curves, Algorithmic Number Theory, Jun. 2004, pp. 169-183.

* cited by examiner

*Primary Examiner*—Gilberto Barron, Jr.
*Assistant Examiner*—Venkat Perungavoor
(74) *Attorney, Agent, or Firm*—Lee & Hayes, PLLC

(57) ABSTRACT

In at least one implementation, described herein, P and $Q_1, \ldots, Q_n$ are public points on an elliptic curve over a finite field, but the ratios of $Q_i$ to P are private. Those ratios are the components $(\alpha_1, \ldots, \alpha_n)$ of a private key, where $Q_i = \alpha_i P$. This implementation generates short digital ciphers (i.e., signatures), at least in part, by mapping a message M to a point T on the elliptic curve and then scaling that point T based upon the private key $\alpha$ to get S. At least one other implementation, described herein, verifies those ciphers by comparing pairing values of two pairs, where one pair is the public point P and the scaled point S and another pair is public Q and the point T. This implementation tests whether $\log(Q)/\log(P) = \log(S)/\log(T)$, without computing any elliptic curve discrete logarithm directly.

35 Claims, 3 Drawing Sheets

CRYPTOGRAPHIC PAIRING-BASED SHORT SIGNATURE GENERATION AND VERIFICATION

TECHNICAL FIELD

This invention generally relates to a technology for cryptography.

BACKGROUND

Over the centuries, for as long as information has been communicated between two individuals, it has been susceptible to third-party interception, eavesdropping, compromise and/or corruption. Traditionally, this problem has been handled through the development, over the years, of increasingly sophisticated cryptographic techniques.

Key-Based Ciphers

One class of these sophisticated cryptographic techniques involves the use of key-based ciphers. In particular, through a key-based cipher, a sequence of intelligible data (i.e., plaintext) that collectively form a message are mathematically transformed, through an enciphering algorithm, into seemingly unintelligible data (i.e., so-called ciphertext).

As a practical matter, a particular cipher that generates any given ciphertext should be sufficiently secure from cryptanalysis. To provide a requisite level of security, a unique key is typically selected which defines a unique corresponding cipher.

Generally speaking, the strength of any cryptographic technique (and hence the degree of protection it affords from third-party intrusion) is directly proportional to the time required, by a third party, to perform cryptanalysis. With a key-based cipher, cryptanalysis is where a third party is able to successfully convert the ciphertext into its corresponding plaintext without prior knowledge of the key.

As technology evolves, the art of cryptography advances in a continual effort to develop increasingly sophisticated cryptographic techniques that withstand correspondingly intensifying cryptanalysis.

Short Signatures

Digital signatures on binary messages are the digital equivalent of human signatures on printed documents. Signatures must be short in environments with strong bandwidth constraints. For example, software product registration systems often ask users to enter a signature provided on a product label.

Primarily for customer service reasons and other practical constraints, it is highly desirable to use a short signature when a human is asked to manually enter the signature. Similarly, due to space constraints, short signatures are desirable when one prints a bar-coded digital signature on a postage stamp. Also, legacy protocols typically have a fixed short field for non-repudiation.

However, the shorter a signature is, the easier that it is for a digital pirate to break the system by cryptanalysis. Therefore, schemes have been developed with the intent of increasing the security of a cipher given an allotted fixed field length.

SUMMARY

Described herein is a technology for cryptography.

In at least one implementation, described herein, P and $Q_i, \ldots, Q_n$ are public points on an elliptic curve over a finite field, but the ratios of $Q_i$ to P are private. Those ratios are the components $(\alpha_1, \ldots, \alpha_n)$ of a private key $\alpha$, where $Q_i = \alpha_i P$.

An implementation, described herein, generates short digital ciphers (i.e., signatures), at least in part, by mapping a message M to a point T on the elliptic curve and then scaling that point T based upon the private key $\alpha$ to get S. At least one other implementation, described herein, verifies those ciphers by comparing pairing values of two pairs, where one pair is the public point P and the scaled point S and another pair is public Q and the point T. This implementation tests whether $\log(Q)/\log(P) = \log(S)/\log(T)$, without computing any elliptic curve discrete logarithm directly.

This summary itself is not intended to limit the scope of this patent. Moreover, the title of this patent is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific exemplary details. In other instances, well-known features are omitted or simplified to clarify the description of the exemplary implementations of present invention, thereby better explain the present invention. Furthermore, for ease of understanding, certain method steps are delineated as separate steps; however, these separately delineated steps should not be construed as necessarily order-dependent in their performance.

The following description sets forth one or more exemplary implementations of Cryptographic Pairing-Based Short Signature Generation and Verification that incorporate elements recited in the appended claims. These implementations are described with specificity in order to meet statutory written description, enablement, and best-mode requirements. However, the description itself is not intended to limit the scope of this patent.

The inventors intend these exemplary implementations to be examples. The inventors do not intend these exemplary implementations to limit the scope of the claimed present invention. Rather, the inventors have contemplated that the claimed present invention might also be embodied and implemented in other ways, in conjunction with other present or future technologies.

An example of an embodiment of Cryptographic Pairing-Based Short Signature Generation and Verification may be referred to as an "exemplary short signature architecture". Alternatively, an example embodiment of a generator may be referred to as an "exemplary short signature generator", and an example embodiment of a verifier may be referred to as an "exemplary short signature verifier".

Those who are skilled in the art are directed to find additional useful and relevant information regarding signature compression (i.e., signature shortening) techniques for ElGamal-type signature systems and their derivatives in the following co-owned U.S. Patents:

- U.S. Pat. No. 6,163,841, entitled "Technique for Producing Privately Authenticatable Cryptographic Signature for Authenticating Such Signatures" issued on Dec. 19, 2000; and
- U.S. Pat. No. 6,209,093, entitled "Technique for Producing Privately Authenticatable Product Copy Indicia and for Authenticating Such an Indicia" issued on Mar. 27, 2001.

Figure 3:
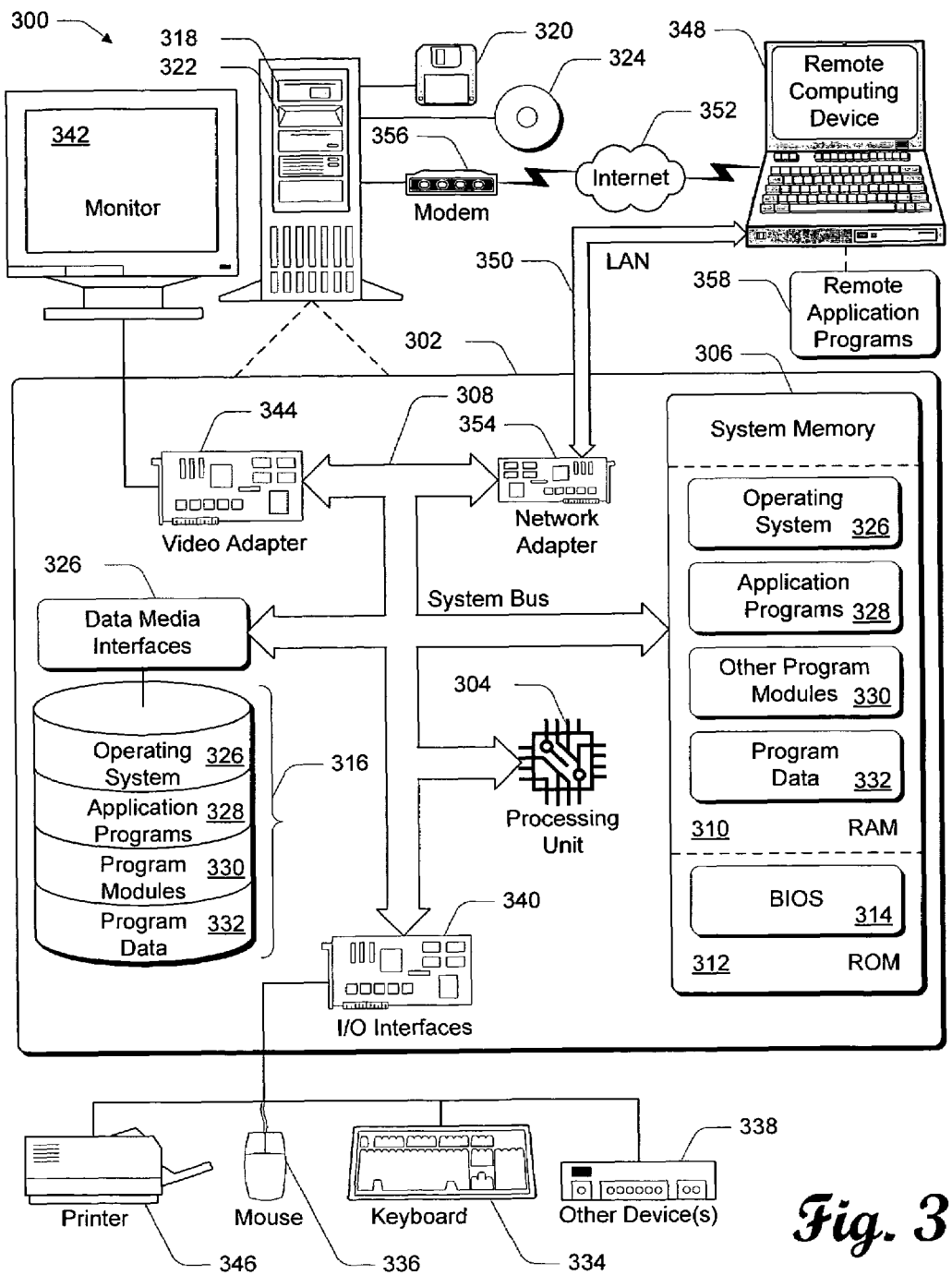
FIG. 3 is an example of a computing operating environment capable of (wholly or partially) implementing at least one embodiment described herein.

The one or more exemplary implementations, described herein, of the present claimed invention may be implemented (in whole or in part) by a computing environment like that shown in FIG. 3.

Some Mathematical Notation Used Herein

| | |
|---|---|
| 0 | Point at infinity on elliptic curve (plus its usual meanings). |
| $\alpha_i$ | Secret (private) exponents in $Q_i = \alpha_i P$ ($1 \leq i \leq n$) |
| $a_4, a_6$ | Coefficients of elliptic curve equation $y^2 = x^3 + a_4 x + a_6$ |
| $\beta_i$ | Secret (private) exponents in $\beta_i P$ ($1 \leq i \leq k$). |
| BK | Backdoor key, known only by the server. |
| $e_m$ | Pairing function, defined on $E[m] \times E[m]$. |
| E | An elliptic curve (or elliptic curve group). |
| E/K | An elliptic curve group E over a field K. |
| E[m] | Group of all $m^2$ points of order (dividing) m on an elliptic curve E, possibly in an extension to the field over which E was defined. |
| $f_c$ | For integer c and point S on $E/K_{base}$, a rational function on $E/K_6$ with divisor $(f_c) = c(S) - c(S) - (c-1)(0)$. |
| Frob | Frobenius endomorphism on an elliptic curve defined over GF(p). If $Q = (x, y)$ is a point on the curve, then $Frob(Q) = (x^p, y^p)$. |
| $\Gamma$ | Parameter used in authentication protocols. |
| \|G\| | Order of a group G (often used in the form \|E/K\|). |
| $g_{U, V}$ | For points U and V on $E/K_6$, the function on $E/K_6$ corresponding to the line through U and V (if U = V, then $g_{U,V}$ is the tangent line to the curve at U, and if either U or V is equal to 0, then $g_{U,V}$ is the vertical line through the other point). |
| $g_U$ | Shortcut for the vertical line $g_{U, -U}$. |
| GF(q) | Finite field with q elements, where q is prime or prime power. |
| h | Hashing function defined on powers of $e_m(P, P_b)$. |
| $H_1(M)$ | Hashing function mapping message M to a vector v of length n, with components being integers modulo m. Alternatively, the components may be ±1 (see the end of the section on "Exemplary Short Signature Generation"). |
| $H_2(M)$ | Hashing function mapping message M to a point of order m, specifically a multiple of $P_b$. |
| $H_3(BK, M)$ | Hashing function dependent on backdoor key BK, mapping message M to an integer from 1 to $\Gamma$. |
| $H_4(BK, M)$ | Hashing function dependent on backdoor key BK, mapping message M to a vector u of length k, with components ±1. |
| $H_5(BK, M)$ | Hashing function dependent on backdoor key BK, mapping message M to an integer from 0 to $\Gamma - 1$. |
| k | Parameter used in authentication protocols. |
| K | A field. |
| K* | Multiplicative subgroup (i.e., all nonzero elements) of a field K. |
| $K_{base}$ | Base field when using field extensions. Same as GF(p). |
| $K_3$ | Degree-3 extension of $K_{base}$. Isomorphic to $GF(p^3)$. |
| $K_6$ | Degree-6 extension of $K_{base}$. Represented as $K_3[t]$. |
| 2L | Length of point S when converted to binary. |
| l | Number of high-order bits truncated from the signature. |
| M | Message to be signed. |
| m | Order of torsion points. |
| n | Length of vectors $\{\alpha_i\}, \{Q_i\}$, and v. |
| P, Q, S, T | Elliptic curve points |
| $P, P_b$ | Independent points of order m on an elliptic curve. In at least one implementation, P has the form (x, ty) |
| | where x, y $\in GF(p^3)$, whereas $P_b \in E/GF(p)$. |
| $\langle P \rangle$ | Subgroup generated by element P. |
| P + Q, P - Q | Elliptic curve addition and subtraction. |
| Q | $\Sigma_{1 \leq i \leq n} v_i Q_i$, as computed by a verifier. |
| $Q_i$ | Public points $Q_i = \alpha_i P$ ($1 \leq i \leq n$). |
| r | Degree of extension needed so E[m] has the full $m^2$ elements over $GF(p^r)$. |
| S | $\alpha T$ for some $\alpha$ known only to the signer. |
| S' | A multiple of $P_b$, as computed by the signer. |
| T | $H_2(M)$, a multiple of $P_b$. |
| t | Element of $GF(p^2)$ such that $t^2 = w$. |
| $\tau$ | (1) Integer such that $\|E/GF(p)\| = p + 1 - \tau$. (2) Mapping from a subgroup of $E/K_6$ to a curve over $K_3$. |
| u | (1) Vector, length k, with values ±1, as output by $H_4(BK, M)$. (2) Exponent with $\Gamma$ potential values, as output by $H_3(BK, M)$ or $H_5(BK, M)$. |
| v | Vector of length n, as output by $H_1(M)$, sometimes with elements restricted to ±1. |
| w | Quadratic non-residue modulo p. |

Elliptic Curve Notations and Properties

A common equation for an elliptic curve E over a field K, not of characteristic 2 or 3, is $$E: y^2 = x^3 + \alpha_4 x + \alpha_6$$

where $\alpha_4, \alpha_6 \in K$ and $4\alpha_4^3 + 27\alpha_6^2 \neq 0$.

As is well-known, the points on E together with a point at infinity (called 0) form an abelian group. Within this document, the upper case letters P, Q, S, T denote points (finite or infinite) on an elliptic curve. Given two points $P_1$ and $P_2$ on the curve, elliptic curve addition produces a third point on the curve (e.g., $P_1 + P_2 = Q$). One can recover one of those two input points by subtracting the other from the sum (e.g., $P_2 = Q - P_1$). Adding the zero point (also called point at infinity or the identity) to P produces P (e.g., $0 + P = P$). We sometimes use the summation symbol $\Sigma$ when adding several group elements.

Herein, the "order of a point" (P) is the smallest positive integer m, such that $mP = P + P + P + \ldots + P = 0$ (wherein m copies of P are added together). The order of a point is always finite when the curve is defined over a finite field.

Intractability Assumptions

The exemplary short signature architecture utilizes some intractability assumptions. Examples of some of those assumptions include:

Keyed hashing functions behave as random oracles.
Discrete log on Elliptic curves (EC DLOG) is modeled by generic or black box group model.
The Computational Diffie-Hellman assumption.
Discrete log on Elliptic curves is modeled by Generic or Black box group model. With this, there is a lower bound for the discrete log problem: the attack takes $\sqrt{|G|}$ steps of computation if the underlying group is G. The black box model assumes essentially that the group elements appear as if encrypted by a random oracle.

In general, the Computational Diffie-Hellman problem (CDH) is "hard" on certain elliptic curves over a finite field. Herein, "hard" means that its calculation is highly impractical given current computational capabilities. Put another way, the CDH assumption, when applied to the multiplicative group $GF(p)^*$, suggests that the task of computing the map $(g, g^a, g^b) \rightarrow g^{ab}$ is hard, when g generates a large subgroup. The exemplary short signature architecture utilizes the CDH assumption as applied to groups over curves.

Another example of a hard assumption is the DLOG assumption. The DLOG assumption problem is this:

Using elliptic curve arithmetic, m'P=P+P+P+P+. . .+P=Q, where P is repeated m' times.

The assumption is that it is hard to find m' when given Q and P.

Those of ordinary skill in the field understand and appreciate the CDH assumption. It is discussed further in *Short signatures based on Weil pairing*, D. Boneh, B. Lynn and H. Shacham, In C. Boyd, editor, *Proceeding of Asiacrypt*, 2001, volume 2248 of LNCS. Springer-Verlag, 2001.

General Pairing Function

Given an elliptic curve E over a field K, and a positive integer m, we let E[m] denote the points P on E such that mP=0 (i.e., points whose order divides m). This E[m] will always be a subgroup of E, and will have exactly $m^2$ elements if the field with coordinates of the vectors is large enough.

If P, Q∈E[m], a generic notation for a pairing function is $e_m(P, Q)$. The output of $e_m(P, Q)$ is an m-th root of unity in K. Two well-known types of pairing functions are: Tate or Weil. Those of ordinary skill in the art are familiar with these pairing functions.

Also, those who are skilled in the art understand that these pairings have a bilinear property:

$$e_m(P, Q_1+Q_2)=e_m(P, Q_1)e_m(P, Q_2)$$

$$e_m(P_1+P_2, Q)=e_m(P_1, Q)e_m(P_2, Q)$$

for all P, $P_1$, $P_2$, Q, $Q_1$, $Q_2$∈E[m]. A consequence is $$e_m(\alpha P, Q)=e_m(P, Q)^\alpha=e_m(P, \alpha Q)$$

where P, Q∈E[m] and α is an integer.

Selection of curves

The exemplary short signature architecture may use, for example, genus 1 or genus 2 elliptic curves defined over a prime field GF(p). For the purposes of discussion, the focus herein is on the genus 1 case.

The Weil, Tate, Squared Weil, and Squared Tate Pairings on this type of curve all map into the finite field having an extension of degree r, where r is large enough that (E/GF(p'))[m] has a full $m^2$ elements. For a random curve, by the results of Balasubramanian and Koblitz, the degree of this extension will be quite large except with negligible probability. However one can use specialized methods to pick, for example, curves whose extension has suitable degree r=6 or r=8. This will enable avoiding expensive computations that would result from a high-degree extension. The exemplary short signature architecture may also include computations when r=6.

Exemplary Short Signature Architecture

The exemplary short signature architecture utilizes pairing-based signatures where a message M has a signature with two components (M, S), where S is a point on a curve. This signature is deterministic.

In at least some implementations, the ratio of |E/GF(p)| to m will be small. Then the security of the system, in a generic oracle model, is on the order of $2^L$, where 2L is the length of S in binary. (This can be seen as follows: The security of the system, in a generic oracle model, is on the order of sqrt(m). The binary length of S is $\log_2(P)$, which is approximately $\log_2(|E/GF(p)|)$. Then L, which is half of that length, will be close to $\log_2$ sqrt(m).)

In comparison, the ElGamal-type signatures are randomized, where a given message has many different valid signatures depending on the random number used in signing the message.

Alternatively, the exemplary short signature architecture may utilize pairing-based signatures where a message M has a signature with only one component.

Notations for the description of the Exemplary Short Signature Architecture

The exemplary short signature architecture uses an elliptic curve (E/GF(p)). Fix a positive integer m and a point P of order m on E. Let $e_m$:E[m]×E[m]→GF(p)* denote the Tate or Weil or Squared Tate or Squared Weil Pairing on E[m]. Select a value of n.

The following are the public and private keys:

Private Key: Scaling factors $\alpha_i, \ldots \alpha_n$, each from 0 to m−1

Public Key: p, m, n, P, $Q_1=\alpha_1 P, \ldots Q_n=\alpha_n P$.

The architecture employs two hashing functions ($H_1$ and $H_2$), which are effectively viewed as random oracles. They are defined as follows. Given a message M, the output of M→$H_1$(M) is a vector v=$H_1$(M) of length n with values modulo m. One implementation is: $v_i$=$SHA_1$($K_1$, M, i) mod m, where $K_1$ is an arbitrary fixed string. The output of $H_2$(M) is a point of order m on the curve—the $H_2$ definition might map to a multiple of $P_b$, where $P_b$ is a point of order m on E but independent of P.

One implementation of $H_2$ is as follows: Set a counter to 0. A hashing function is applied to M and the value of the counter, and the result is converted to a value x over GF(p). The value of $f(x)=x^3+\alpha_4 x+\alpha_6$, where $\alpha_4$ and $\alpha_6$ are the coefficients of the equation defining E, is computed. If f(x) has a square root, then y is set to one of the square roots (the choice of which square root to select is done using a hashing function). If f(x) does not have a square root, the counter is incremented and the process is repeated. Once a point (x, y) is obtained, this point is multiplied by |E/GF(p)|/m to obtain an m-torsion point. It can be shown that for some choices of system parameters, the resulting m-torsion point will be a multiple of $P_b$. $H_2$ definition may employ the computation of a Jacobi symbol.

Exemplary Short Signature Generation

A computing environment (e.g., software manufacturer's servers or centralized server) may generate a short signature using the exemplary short signature generator. Generating the signature of a message is also called "signing" the message.

Figure 1:
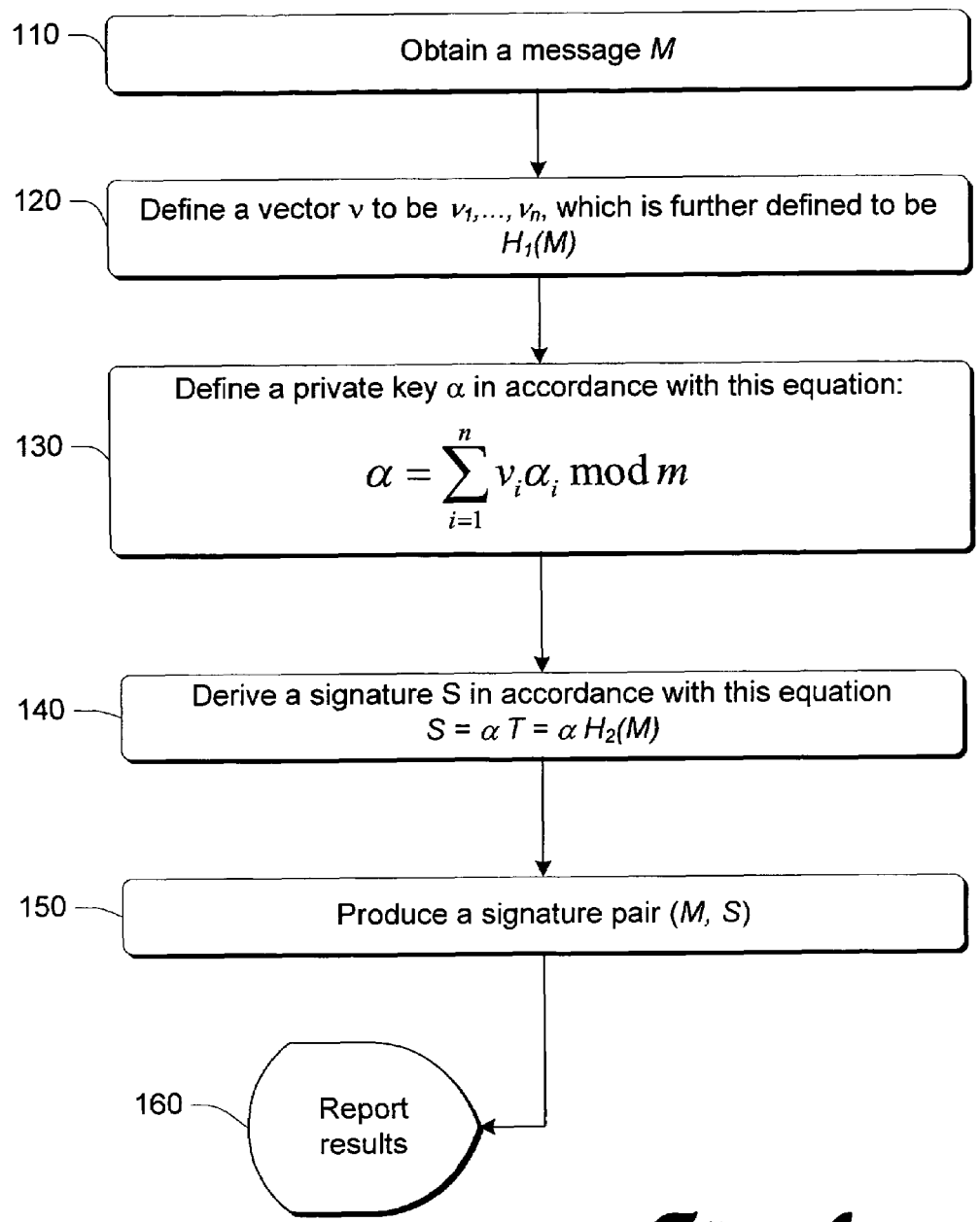
FIG. 1 is a flow diagram showing a methodological implementation described herein.

FIG. 1 shows a methodological implementation of the exemplary short signature generator. This methodological implementation may be performed in software, hardware, or a combination thereof.

At 110, the exemplary short signature generator receives input that is a message M. It may be, for example, a plaintext message, a product identification, or other such message.

At 120, it defines a vector v to be $v_1, \ldots v_n$, which is further defined to be a hashing function on the message ($H_1$(M)). The exemplary short signature generator produces the vector v in accordance with the following equation:

$$v \stackrel{def}{=} (v_1, \ldots, v_n) = H_1(M) \tag{1.1}$$

At 130, the exemplary short signature generator defines the private key α based upon the vector v and the private key components ($\alpha_1, \ldots, \alpha_n$) in accordance with the following equation:

$$\alpha = \sum_{i=1}^{n} v_i \alpha_i \bmod m \quad (1.2)$$

Using another hashing function, at 140, it maps a new m-torsion point T on the curve based upon the message M, in accordance with this equation $T=H_2(M)$. Furthermore, it derives a signature S using point T and the private key $\alpha$, and in accordance with the following equation:

$$S = \alpha T = \alpha H_2(M) \quad (1.3)$$

At 150, the exemplary short signature generator produces the signature pair (M, S) based upon the results of block 140.

At 160, it indicates the results.

Roughly speaking, the exemplary short signature generator forges short digital ciphers (i.e., signatures) by computing n discrete logs of $\alpha_1 P, \ldots, \alpha_n P$ base P, where n is a positive integer, P is a point on an elliptic curve and a public key, and the scaling factors $\alpha_i$ are an unknown private key. This adds a factor of $\sqrt{n}$ to the security of the system (i.e. the required computational effort to break the system) without affecting the signature length.

Furthermore, the hashing function $H_1$ may output values in $\{\pm 1\}^n$, meaning the output of $H_1$ is a vector of length n all of whose components are +1 or -1. Doing so may reduce the time needed to verify signatures and will allow use of large values of n.

Exemplary Short Signature Verification

A computing environment (e.g., a client computer) may verify the short signature using the exemplary short signature verifier. As indicated above, there is a set of public keys $Q_i = \alpha_i P$ based on a point P. Intuitively, the ratio between P and $Q_i$ is $\alpha_i$.

While the points P and points $Q_i$ are known publicly, the scaling factors $\alpha_i$ are private. Thus, $\alpha_i$ is known only by the signer (not by the verifier).

Figure 2:
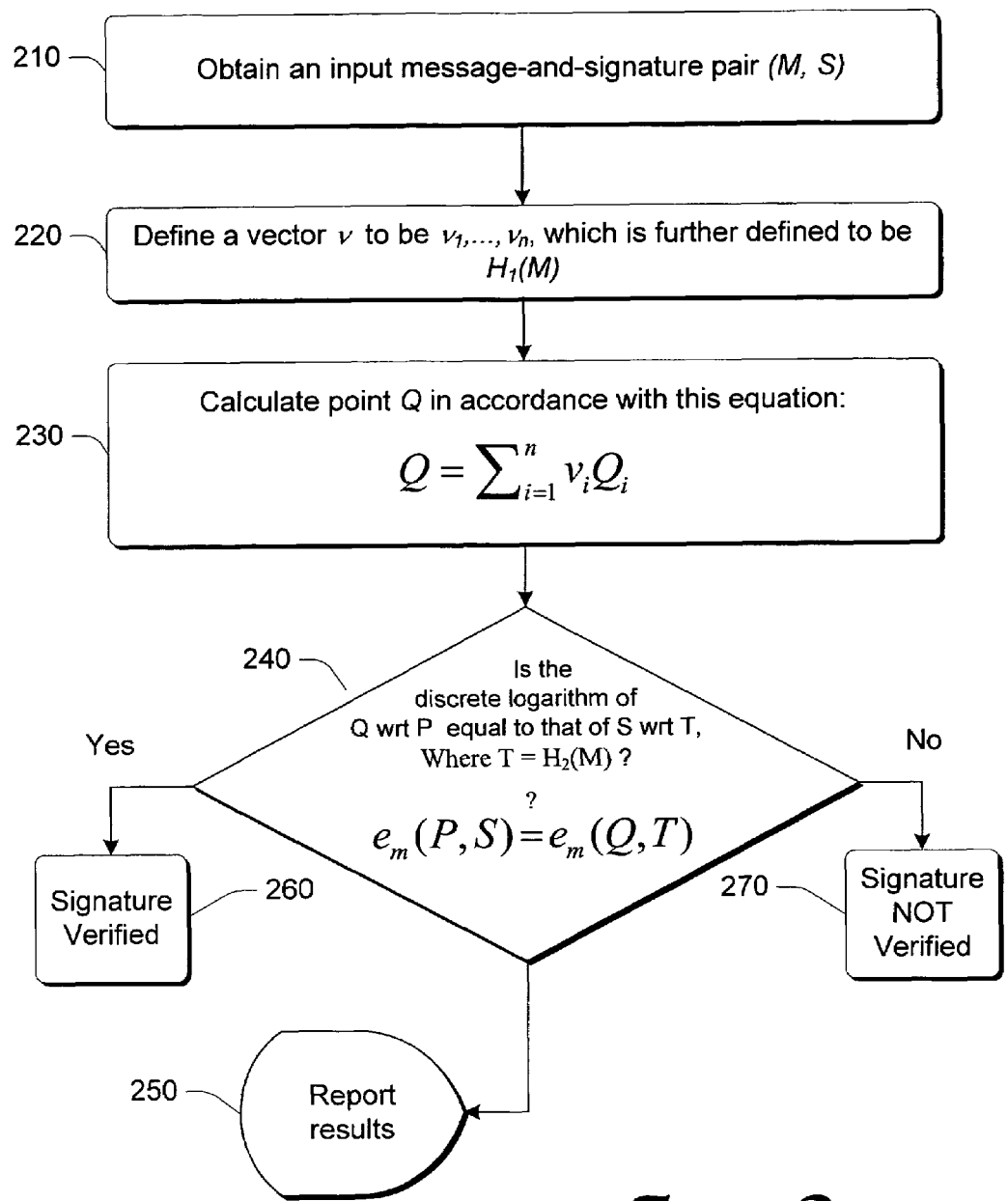
FIG. 2 is a flow diagram showing a methodological implementation described herein.

FIG. 2 shows a methodological implementation of the exemplary short signature verifier. This methodological implementation may be performed in software, hardware, or a combination thereof.

At 210, the exemplary short signature verifier obtains an input message-and-signature pair, which is labeled (M, S). For a valid signature, $S = \alpha T = \alpha H_2(M)$.

At 220, it defines the vector v to be $v_i, \ldots v_n$, which is further defined to be $H_1(M)$. The verifier calculates the vector v in accordance with the following equation:

$$v \stackrel{def}{=} (v_1, \ldots, v_n) = H_1(M). \quad (1.4)$$

At 230, the verifier calculates a point Q in accordance with this equation:

$$Q = \Sigma_{1 \leq i \leq n} v_i Q_i \quad (1.5)$$

This calculation utilizes known components, namely the elements $(v_1, \ldots, v_n)$ of vector v that were calculated above (in equation (1.4)) and the publicly known points $(Q_1, \ldots, Q_n)$. Although the verifier does not know the scalars $\alpha_i$, nor the signer's value of $\alpha$, the computed Q in (1.5) will satisfy $$Q = \Sigma_{1 \leq i \leq n} v_i(\alpha_i P) = (\Sigma_{1 \leq i \leq n} v_i \alpha_i) P = (\Sigma_{1 \leq i \leq n} v_i \alpha_i \bmod m) P = \alpha P.$$

At 240, utilizing the pairing function, the exemplary short signature verifier determines whether the pairing results of the pair (P, S) and the pair (Q, T), where $T=H_2(M)$, are equivalent in accordance with this equation:

$$e_m(P, S) = e_m(Q, T)? \quad (1.5)$$

At 250, it indicates the results of the test.

If they match, then the verifier accepts the signature at 260. Otherwise, it rejects the signature at 270.

Since $Q=\alpha P$ and $S=\alpha T=\alpha H_2(M)$, the verifier will verify a valid signature because:

$$e_m(P, S) = e_m(P, \alpha T) = e_m(P, T)^\alpha = e_m(\alpha P, T) = e_m(Q, T).$$

Signatures with Authentication Tags

While the public-private-key signature systems have a high degree of security, they rely heavily on the private key remaining secret. If a digital pirate discovers the private key (e.g., via cryptanalysis or a ruse), a traditional public-private-key signature system is compromised.

To address this, an alternative exemplary short signature architecture may be configured to have a mechanism for checking the authenticity of a signature. In this implementation, the breaking of the public-private-key system alone will not allow the production of signatures that would validate at a centralized verification server.

One way to accomplish this adds one or more additional so-called "fail-stop" signatures. Such is discussed in the *Handbook of Applied Cryptography*, Menezes, Oorschot, and Vanstone (CRC Press, 1996). With this, the compromise of the public key does not lead to the discovery to the specific private key of the signer. However, adding such a signature to the existing one increases the overall length of the signature.

With this implementation of the alternative exemplary short signature architecture, an authentication tag is incorporated into the signature.

Within it, a parameter $\Gamma$ is fixed. This alternative exemplary short signature architecture employs a so-called "backdoor" check key BK, which is held private and secret at the server. A new hashing function, $H_3(BK, M)$, maps a message M into an integer from 1 to $\Gamma$.

The alternative exemplary short signature generator signs a message M by computing $\mu = H_3(BK, M)$. The output of the new generator is $(M, \mu S)$ where S is computed as before.

To verify a signature (M, S') without possession of the backdoor check key BK (i.e., not at the server), the alternative exemplary short signature verifier searches through all $\Gamma$ numbers from 1 to $\Gamma$ until an exponent $\mu$ is found such that $e_m(P,S') = e_m(Q,T)^\mu$, where Q and T are computed as above. If such a $\mu$ is found, the signature is accepted. Otherwise, the signature is rejected. This adds on the order of $\Gamma$ steps to signature verification time.

When a signature (M, S') is being verified at the server, the alternative exemplary short signature verifier can compute $\mu = H_3(BK, M)$ directly rather than try $\Gamma$ potential values of $\mu$. It then checks whether $e_m(P,S') = e_m(Q,T)^\mu$. If the equality holds, the signature is accepted. Otherwise, the signature is rejected.

With this approach, even if a digital pirate is able to determine the private key ($\alpha_1, \ldots, \alpha_n$), she will not be able to generate signatures that will fool the server except with probability $1/\Gamma$. The verifier at the server will accept only signatures for which the multiplier $\mu$ needed to pass the verification test is equal to $H_3(BK,M)$, whereas a verifier at a non-server will accept any $\mu$ from 1 to $\Gamma$.

The hashing function $H_3(BK, M)$ may be implemented using a MAC (such as HMAC-SHA1) using BK as the secret MAC key.

Another Approach for Signatures with Authentication Tags

In this other approach for signatures with authentication tags, a parameter k is fixed. Set $\Gamma=2^k$. The list of above public keys is appended by points $\beta_1P, \beta_2P, \ldots, \beta_kP$.

This alternative exemplary short signature architecture again employs a backdoor check key BK, which is held private and secret at the server. A new hashing function, $H_4(BK, M)$, maps a message M into a k-bit vector $(u_1, \ldots, u_k)$, where $u_i$ take values $\pm 1$.

The alternative exemplary short signature generator signs a message M by computing $H_4(BK, M)=(u_1, \ldots u_k) \in \{\pm 1\}^k$. The output of the new generator is $$\left(M, S + \sum_{i=1}^{k} u_i(\beta_i P)\right)$$

where S was computed earlier.

To verify a signature (M,S') without possession of the backdoor check key BK (i.e., not at the server), the alternative exemplary short signature verifier searches through all $2^k$ strings in $\{\pm 1\}^k$ until a string $(u_1, \ldots, u_k)$ is found such that the pair $$\left(M, S' - \sum_{i=1}^{k} u_i(\beta_i P)\right)$$

passes the verification test. This adds on the order of $\Gamma$ steps to signature verification.

When a signature (M,S') is being verified at the server, the alternative exemplary short signature verifier computes $H_4(BK, M)=(u_1, \ldots u_k) \in \{\pm 1\}^k$ directly. It then checks whether, for that specific string $(u_1, \ldots u_k)$, the pair $$\left(M, S' - \sum_{i=1}^{k} u_i(\beta_i P)\right)$$

passes the verification test.

With this approach, even if a digital pirate is able to determine the private key $(\alpha_1, \ldots, \alpha_n)$, she will not be able to generate signatures that will fool the server except with probability $1/\Gamma$. The verifier at the server will accept only signatures for which the $(u_1, \ldots u_k) \in \{\pm 1\}^k$ vector needed to pass the verification test is equal to $H_4(BK, M)$.

The hashing function $H_4(BK,M)$ may be implemented using a MAC (such as HMAC-SHA1) using BK as the secret MAC key.

Still Another Approach for Signatures with Authentication Tags

In this third scheme for signatures with authentication tags, a parameter $\Gamma$ is fixed.

Let $P_b$ be the generator of the subgroup of size m of E/K in which the outputs of $H_2$ lie. The value of $P_b$ will be included with the public key. In addition, the following procedure is followed at key generation time: Compute a list of powers $e_m(P, P_b)^\mu$, for $0 \leq \mu \leq \Gamma-1$. Pick a hashing function h that maps this list to values in range from 0 to $\Gamma^2-1$ without collisions. Append the description of h to the public key. As an example, h might be implemented as $h(x)=SHA1(\kappa, x) \mod \Gamma^2$, where $\kappa$ is a string that is picked so as to avoid collisions—in which case the string $\kappa$ would be appended to the public key as the description of h. (Note, however, that the function h is not required to have any cryptographic security properties.) Append to the public key the list L of pairs $(h(e_m(P, P_b)^\mu), \mu)$, for $0 \leq \mu \leq \Gamma-1$, sorted by the first element of the pair.

This alternative exemplary short signature architecture again employs a backdoor check key BK, which is held private and secret at the server. A new hashing function, $H_5(BK, M)$, maps a message M to an integer from 0 to $\Gamma-1$.

The alternative exemplary short signature generator signs a message M by computing $S'=S+H_5(BK,M) P_b$, where S was defined earlier. The output of the new generator is (M, S').

To verify a signature (M, S') without possession of the backdoor check key BK (i.e., not at the server), the alternative exemplary short signature verifier computes $\rho=e_m(\rho, S')/e_m(Q, T)$. The verifier then checks whether there is a pair $(h(\rho), \mu)$ on the list L with first element $h(\rho)$, which would imply $h(\rho)=h(e_m(P, P_b)^\mu)$. If not, the signature is immediately rejected. If yes, let $\mu$ be the second element of that pair. The verifier checks whether $\rho=e_m(P, P_b)^\mu$. If yes, the signature is accepted. If not, the signature is rejected. This procedure adds on the order of log $\Gamma$ field multiplications to signature verification.

When a signature (M, S') is being verified at the server, the alternative exemplary short signature verifier checks the equality $e_m(PS')/e_m(Q,T)=e_m(P,P_b)^\mu$ where $\mu=H_5(BK,M)$. If the equality holds, the signature is accepted; otherwise the signature is rejected.

With this approach, even if a digital pirate is able to determine the private key $(\alpha_1, \ldots, \alpha_n)$, she will not be able to generate signatures that will fool the server except with probability $1/\Gamma$. The verifier at the server will accept only signatures for which the exponent $\mu$ of $e_m(P, P_b)$ needed to pass the verification test is equal to $H_5(BK, M)$.

The hashing function $H_5(BK, M)$ may be implemented using a MAC (such as HMAC-SHA1) using BK as the secret MAC key.

Truncation of Signature

To reduce the size of a signature while maintaining security, a few bits of the signature may be dropped. In other words, the signature may be truncated.

After a signature is produced in accordance with the description of the exemplary short signature architecture herein, a fixed number l of high-order bits of the signature S are removed, truncating the signature while retaining all of M. Verification is performed by trying all possible values for these truncated bits and running the exemplary short signature verification algorithm on each resulting bit string. Verification succeeds if and only if at least one value of the truncated bits results in a valid signature.

Doing this does not substantially slow down the signing process. Signature verification, if implemented naively, would be slowed down by a factor of $2^l$, since a single regular verification is naively performed for each possible value of the truncated bits.

The verification speed can be improved by making a few quick checks on the candidate values of the signature (i.e., for specific choices of the values of the truncated bits). The verification checks that the x-coordinate in the signature is between 0 and p-1.

It then checks that this value of x corresponds to a valid point on the curve (by computing the Jacobi symbol of $x^3+\alpha_4 x+\alpha_6$ over p, where $\alpha_4$ and $\alpha_6$ are coefficients of the curve equation).

The verification then checks that the corresponding point(s) have the correct order m (through multiplying a point by m and comparing to 0).

For example, a system may use a point description having 88 bits; however, the description truncates 5 bits (here l=5). Those 5 bits are not communicated to the verifier. Rather, the verifier will effectively prepend a possible combination of the 5 unknown bits, trying all $2^l$ (here, $2^5$=32) of these, stopping early if it finds one that gives it a verified result. If none of them are verified, then the signature verification fails.

When several possible values of the signature are checked for the same message M (as in the truncation technique), the pairing value $e_m(Q, H_2(M))$ may be computed only once, and the values $e_m(P, S')$ (for various choices of S') are compared to it, since Q depends only on $H_1(M)$ and the public key.

Techniques To Improve Performance Of The Exemplary Short Signature Architecture Selection of Curve and Generator Point P The exemplary short signature architecture may use a curve E and generator P that is selected so that the group generated by P is isomorphic to a subgroup of a curve over $GF(p^3)$. This is to speed up key generation and signature verification.

The system parameters may be chosen as follows: Let $K_{base}$=GF(p) where p>3 is prime. Let $E/K_{base}$ be an elliptic curve over $K_{base}$ with equation $y^2=x^3+\alpha_4 x+\alpha_6$ for some $\alpha_4$ and $\alpha_6$ in $K_{base}$. Let m be a large prime dividing both $p^2-p+1$ and the group order $|E/K_{base}|$.

One way to satisfy these conditions finds an integer λ for which $p=\lambda^2+1$ is prime. Choose the elliptic curve group $E/K_{base}$ to have order $\lambda^2+\lambda+1$ and let m be a large prime divisor of $\lambda^2+\lambda+1$. When, for example, λ=−16, −6, −4, −2, 1, 2, 6, 14, 20, or 24, both $\lambda^2+1$ and $\lambda^2+\lambda+1$ are prime.

Let $K_3$, isomorphic to $GF(p^3)$, be an cubic extension of $K_{base}$. Let w be a quadratic non-residue in $K_{base}$—this w remains a non-square in $K_3$ since the extension has odd degree. Let $K_6=K_3(t)$ be an extension of $K_3$ where t∈$GF(p^2)$ satisfies $t^2$=w. This $K_6$ has degree 6 over $K_{base}$.

Choose τ so the group $E/K_{base}$ has order p+1−τ. Then the group orders over the extension fields are $$|E/GF(p^2)|=(p+1-\tau)(p+1+\tau).$$

$$|E/K_3|=(p+1-\tau)(p^2+p\tau+\tau^2-p+\tau+1)=p^3+1-\tau^3+3p\tau.$$

$$|E/K_6|=(p^3+1-\tau^3+3p\tau)(p^3+1+\tau^3-3p\tau).$$

$$|E/K_6|/|E/K_3|=p^3+1+\tau^3-3p\tau=(p+1+\tau)(p^2-p\tau+\tau^2-p-\tau+1).$$

The assumption that m divides both $p^2-p+1$ and $|E/K_{base}|$=p+1−τ ensures that m divides $$p^2-p\tau+\tau^2-p-\tau+1=(p^2-p+1)-\tau(p+1-\tau).$$

The group $|E/K_{base}|$ has an element of order m, and the sextic extension $E/K_6$ has an independent element of order m which is missing from $E/GF(p^2)$ and $E/K_3$. We will use the curve $E/K_6$, with two independent points of order m and with coefficients in the base field $K_{base}$=GF(p).

If Q=(x, y) is a finite point on $E/K_6$, we define its Frobenius endomorphism to be Frob(Q)=$(x^p, y^p)$, wherein the coordinates of Q are replaced by their p-th powers. Since the coefficients of E are in GF(p), the image Frob(Q) will also be a finite point in $E/K_6$. We also define Frob(0)=0, the point at infinity. The Frobenius endomorphism preserves elliptic curve addition: Frob($Q_1+Q_2$)=Frob($Q_1$)+Frob($Q_2$) for arbitrary $Q_1$, $Q_2$ in $E/K_6$. It also preserves scalar multiplication.

Given E, a generator P of order m and not in $E/K_{base}$ (where $P_b$ lies) may be chosen as follows: Start with a random P'∈$E/K_6$. Set $$P''=P'-Frob^3(P')=P'-Frob(Frob(Frob(P')))$$

followed by P'''=P''+Frob(P''). Here the $Frob^3$ operator leaves elements of $K_3$ and $E/K_3$ invariant, so the (1−$Frob^3$) annihilates everything in $E/K_3$. The (1+Frob)(1−$Frob^3$)=(1+Frob+$Frob^2$)(1−$Frob^2$) operator also annihilates $E/GF(p^2)$, but only about $p^4$ of the approximately $p^6$ elements of $E/K_6$. The image P''' will be in a subgroup of order $$(|E/K_6|/|E/K_3|)/(|E/GF(p^2)|/|E/GF(p)|)=p^2-p\tau+\tau^2-p-\tau+1.$$

Set P=(($p^2-p\tau+\tau^2-p-\tau+1$)/m) P'''. Then mP=0. If P=0, try again with another P'.

Observe that $Frob^6$(Q)=Q for all Q∈$E/K_6$. Therefore $$Frob^3(P'') = Frob^3(P' - Frob^3(P')) = Frob^3(P') - Frob^6(P')$$

$$= Frob^3(P') - P' = -P''.$$

Hence either P'' is infinite or it has the form (x, ty) with x, y∈$K_3$. All non-infinite points in the subgroups ⟨P'⟩ and ⟨P⟩ of $E/K_6$ generated by P'' or by P have this form.

Over the field $K_3$, let E' be the curve $y'^2=x'^3+\alpha_4 w^2 x'+\alpha_6 w^3$. The map τ:⟨P⟩→E' defined by (x, ty)→(xw, $yw^2$) is an isomorphism from ⟨P⟩ to the image τ(⟨P⟩). The maps τ and $τ^{-1}$ can be easily computed.

This map τ may be used to reduce point addition and scalar multiplication in ⟨P⟩, which would normally involve operations over $GF(p^6)$, to point addition and multiplication in τ(⟨P⟩), which involves operations only over $GF(p^3)$. This approach may speed up key generation and signature verification.

In addition, this may also be used to reduce the size of the public key, as points over $E/K_6$ may be represented as points over $E/K_3$ (reducing the storage size of each point in half). The points may be directly generated in that form. They may also be used in that form for computing the weighted sums in signature verification. With this, only the result of the weighted sum need be converted back to $E/K_6$ only for the pairing computation.

Selection of Other Values

Fix points S and T on E. The computation of the pairing $e_m$(S, T) can be performed through repeated application of Miller's formula $f_{b+c}(T)=f_b(T)\cdot f_c(T)\cdot g_{bS,cS}(T)/g_{(b+c)S}(T)$ for integers b and c. Here $f_c$ denotes a rational function defined on the curve E with divisor $$(f_c)=c(S)-(cS)-(c-1)(0),$$

while $g_{bs,cs}$(T) is a line through bS and cS, and $g_{(b+c)S}$(T) is a vertical line through (b+c)S.

With the exemplary short signature architecture, one may choose the parameters in such a way that the values of $g_{(b+c)S}$(T) do not need to be computed in the pairing computation.

Choose prime p, curve E with coefficients over GF(p), and prime m in such a way that m divides |E/GF(p)|, m divides $p^6-1$, and m does not divide $p^i-1$ for any 1≦i≦6. Choose $K_6$ and P as above.

When the Tate Pairing has arguments (S, T) where S∈E/GF(P) and T∈⟨P⟩−{O} ⊂ E/K−E/GF(p), the values of $g_{(b+c)S}(T)$ do not need to be computed, as shown below.

One has $g_{(b+c)S}(T)=x(T)-x((b+c)S)$ (where $x(\cdot)$ is the function mapping curve points to their x coordinates). Now, since T∈⟨P⟩, T has the form (x,ty) with x,y∈GF($p^3$) (see above). Thus, $x(T) \in GF(p^3)$. Also, $x((b+c)S) \in GF(p) \subset GF(p^3)$, as S∈E/GF(p). It follows that $g_{(b+c)S}(T) \in GF(p^3)$.

As T∉E/GF(p), it follows that T∉{±(b+c)S} since {±(b+c)S} ⊆ E/GF(p). Consequently, $x(T) \neq x((b+c)S)$ (note that the x coordinates of two elliptic curve points are equal only if either the points are equal, or one is a negation of the other). It follows that $g_{(b+c)S}(T)=x(T)-x((b+c)S) \neq 0$. To summarize, we have shown that $g_{(b+c)S}(T) \in GF(p^3)-\{0\}=GF(p^3)^*$ (the multiplicative group of $GF(p^3)$).

Next, by assumption, one has $m|p^6-1=(p^3+1)(p^3-1)$, but $m \nmid p^3-1$. As m is prime, it follows that $m \backslash p^3+1$. Consequently, $(p^6-1)/m=(p^3-1) \times (p^3+1)/m$ is divisible by $p^3-1$.

Now, since $g_{(b+c)S}(T) \in GF(p^3)^*$, one has $g_{(b+c)S}(T)^{p^3-1}=g_{(b+c)S}(T)^{|GF(p^3)|}=1$. As shown, $p^3-1$ divides $(p^6-1)/m$, and so $g_{(b+c)S}(T)^{(p^6-1)/m}=1$. Note that the result of the pairing computation is raised to the power $(p^6-1)/m$. It follows that the factor $g_{(b+c)S}(T)$ in the computation can be replaced by 1, as in the final exponentiation it will become 1.

Efficient Exponentiation to the Power $p^3-1$

Exponentiation to the power $p^3-1$ is used as part of the final exponentiation in the pairing computation.

Assume the system parameters are chosen as above. During the final phases of a Tate Pairing or Squared Tate Pairing, an element v of $K_6$, in the form $v=a+b\sqrt{w}$ for a, b∈$K_3$ and quadratic non-residue w∈GF(p), needs to be raised to the power $(p^6-1)/m$. The exponentiation is done in three steps: v is raised to the power $p^3-1$, and then to the powers p+1 and $(p^2-p+1)/m$ (as mentioned earlier, $p^2-p+1$ is assumed divisible by m).

The computation of $v^{p^3-1}$ is done as follows: One computes $\bar{v}=a-b\sqrt{w}$. One then computes the result $v^{p^3-1}$ as $\bar{v}/v$.

The computation of a (p+1)-th power consists of a p-th power times the original, and is easy in characteristic p.

Checking the Jacobi Symbol

The computation of $H_2(M)$ can be speeded up, on the average, by checking the Jacobi symbol before trying to extract a square root.

In the computation of $H_2(M)$ it is necessary to use a random value of x∈GF(p) to generate a point on the curve E/GF(p), or try again if x does not correspond to a point. This involves computing the square root of $f(x)=x^3+\alpha_4 x+\alpha_6$, where $\alpha_4$ and $\alpha_6$ are the coefficients of E. Note that the square root might not be defined. The optimization is that the Jacobi symbol $$\left(\frac{f(x)}{p}\right)$$

is computed first and compared to +1 or to 0, to check whether a square root exists. When y exists, and a square root chosen as part of the definition of $H_2$, the resulting point (x, y) can be multiplied by $|E/GF(p)|/m$ to get an m-torsion point Storing The Public Key Points The public key points may be stored in the form $P_1 \pm P_2$, $P_3 \pm P_4, \ldots$ to speed up the computation of $\pm P_1 \pm P_2 \pm \ldots$, without increasing storage.

In the process of signature verification, it is necessary to compute a sum of the form $$\sum_{i=1}^{n} v_i P_i,$$

where $P_1, \ldots, P_n$ are points on $E/K_6$ that are part of the public key, and $v_i \in \{\pm 1+\}$ depend on the message. Assume that n is even. Done naively, the computation of the above sum takes $n/-1$, point additions/subtractions. The method described here reduces this number to $n/2-1$, with some precomputation, but without increase in long-term storage.

The method is as follows: Instead of storing the values $P_1$, $P_2, \ldots, P_n$ in the public key, store the pairs of values $P_1 \pm P_2$, $P_3 \pm P_4, \ldots, P_{n-1} \pm P_n$. Note that the size of the public key does not increase (n points are replaced by n points).

The computation of a sum $\pm P_1 \pm P_2 \pm \ldots \pm P_n$ is done as follows: The sum is broken into blocks of 2 points, as follows: $(\pm P_1 \pm P_2)+(\pm P_3 \pm P_4)+\ldots+(\pm P_{n-1} \pm P_n)$. Now the value of each block $\pm P_{2i-1} \pm P_{2i}$ is either stored directly (if $P_{2i-1}$ appears with a positive sign), or its negation is stored (if $P_{2i-1}$ appears with a negative sign). Thus the sum is transformed into the form $\pm P_1' \pm P_2' \pm \ldots \pm P'_{n/2}$, which has only n/2 terms.

Note that the method can be adapted to block lengths greater than 2 (i.e., weighted sums of more than 2 points could be precomputed), for greater speed-up, but that would lead to an increase in storage requirements.

Exemplary Computing System and Environment

FIG. 3 illustrates an example of a suitable computing environment 300 within which an exemplary short signature architecture, as described herein, may be implemented (either fully or partially). The computing environment 300 may be utilized in the computer and network architectures described herein.

The exemplary computing environment 300 is only one example of a computing environment and is not intended to suggest any limitation as to the scope of use or functionality of the computer and network architectures. Neither should the computing environment 300 be interpreted as having any dependency or requirement relating to any or components illustrated in the exemplary computing environment 300.

The exemplary short signature architecture may be implemented with numerous other general purpose or special purpose computing system environments or configurations. Examples of well-known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, smart cards, distributed computing environments that include any of the above systems or devices, and the like.

The exemplary short signature architecture may be described in the general context of computer-executable instructions, such as program modules, being executed by a computer. Generally, program modules include routines, programs, objects, components, data structures, etc. that perform particular tasks or implement particular abstract data types. The exemplary short signature architecture may also be practiced in distributed computing environments where tasks are performed by remote processing devices that are linked through a communications network. In a distributed computing environment, program modules may be located in both local and remote computer storage media including memory storage devices.

The computing environment 300 includes a general-purpose computing device in the form of a computer 302. The components of computer 302 may include, but are not limited to, one or more processors or processing units 304, a system memory 306, and a system bus 308 that couples various system components including the processor 304 to the system memory 306.

The system bus 308 represents one or more of any of several types of bus structures, including a memory bus or memory controller, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 302 typically includes a variety of computer readable media. Such media may be any available media that is accessible by computer 302 and include both volatile and non-volatile media, removable and non-removable media.

The system memory 306 includes computer readable media in the form of volatile memory, such as random access memory (RAM) 310, and/or non-volatile memory, such as read-only memory (ROM) 312. A basic input/output system (BIOS) 314, containing the basic routines that help to transfer information between elements within computer 302, such as during start-up, is stored in ROM 312. RAM 310 typically contains data and/or program modules that are immediately accessible to and/or presently operated on by the processing unit 304.

Computer 302 may also include other removable/non-removable, volatile/non-volatile computer storage media. By way of example, FIG. 3 illustrates a hard disk drive 316 for reading from and writing to a non-removable, non-volatile magnetic media (not shown), a magnetic disk drive 318 for reading from and writing to a removable, non-volatile magnetic disk 320 (e.g., a "floppy disk"), and an optical disk drive 322 for reading from and/or writing to a removable, non-volatile optical disk 324 such as a CD-ROM, DVD-ROM, or other optical media. The hard disk drive 316, magnetic disk drive 318, and optical disk drive 322 are each connected to the system bus 308 by one or more data media interfaces 326. Alternatively, the hard disk drive 316, magnetic disk drive 318, and optical disk drive 322 may be connected to the system bus 308 by one or more interfaces (not shown).

The disk drives and their associated computer-readable media provide non-volatile storage of computer readable instructions, data structures, program modules, and other data for computer 302. Although the example illustrates a hard disk 316, a removable magnetic disk 320, and a removable optical disk 324, it is to be appreciated that other types of computer readable media which may store data that is accessible by a computer, such as magnetic cassettes or other magnetic storage devices, flash memory cards, CD-ROM, digital versatile disks (DVD) or other optical storage, random access memories (RAM), read-only memories (ROM), electrically erasable programmable read-only memory (EEPROM), and the like, may also be utilized to implement the exemplary computing system and environment.

Any number of program modules may be stored on the hard disk 316, magnetic disk 320, optical disk 324, ROM 312, and/or RAM 310, including by way of example, an operating system 326, one or more application programs 328, other program modules 330, and program data 332.

A user may enter commands and information into computer 302 via input devices such as a keyboard 334 and a pointing device 336 (e.g., a "mouse"). Other input devices 338 (not shown specifically) may include a microphone, joystick, game pad, satellite dish, serial port, scanner, and/or the like. These and other input devices are connected to the processing unit 304 via input/output interfaces 340 that are coupled to the system bus 308, but may be connected by other interface and bus structures, such as a parallel port, game port, or a universal serial bus (USB).

A monitor 342 or other type of display device may also be connected to the system bus 308 via an interface, such as a video adapter 344. In addition to the monitor 342, other output peripheral devices may include components such as speakers (not shown) and a printer 346 which may be connected to computer 302 via the input/output interfaces 340.

Computer 302 may operate in a networked environment using logical connections to one or more remote computers, such as a remote computing device 348. By way of example, the remote computing device 348 may be a personal computer, portable computer, a server, a router, a network computer, a peer device or other common network node, and the like. The remote computing device 348 is illustrated as a portable computer that may include many or all of the elements and features described herein relative to computer 302.

Logical connections between computer 302 and the remote computer 348 are depicted as a local area network (LAN) 350 and a general wide area network (WAN) 352. Such networking environments are commonplace in offices, enterprise-wide computer networks, intranets, and the Internet.

When implemented in a LAN networking environment, the computer 302 is connected to a local network 350 via a network interface or adapter 354. When implemented in a WAN networking environment, the computer 302 typically includes a modem 356 or other means for establishing communications over the wide network 352. The modem 356, which may be internal or external to computer 302, may be connected to the system bus 308 via the input/output interfaces 340 or other appropriate mechanisms. It is to be appreciated that the illustrated network connections are exemplary and that other means of establishing communication link(s) between the computers 302 and 348 may be employed.

In a networked environment, such as that illustrated with computing environment 300, program modules depicted relative to the computer 302, or portions thereof, may be stored in a remote memory storage device. By way of example, remote application programs 358 reside on a memory device of remote computer 348. For purposes of illustration, application programs and other executable program components such as the operating system are illustrated herein as discrete blocks, although it is recognized that such programs and components reside at various times in different storage components of the computing device 302, and are executed by the data processor(s) of the computer.

Computer-Executable Instructions

An implementation of an exemplary short signature architecture may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 3 illustrates an example of a suitable operating environment 300 in which an exemplary short signature architecture may be implemented. Specifically, the exemplary short signature architecture(s) described herein may be implemented (wholly or in part) by any program modules 328-330 and/or operating system 326 in FIG. 3 or a portion thereof.

The operating environment is only an example of a suitable operating environment and is not intended to suggest any limitation as to the scope or use or functionality of the exemplary short signature architecture(s) described herein. Other well-known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipments, general- and special-purpose appliances, application-specific integrated circuits (ASICs), network PCs, minicomputers, mainframe computers, distributed computing environments that include any of the above systems or devices, and the like.

Computer Readable Media

An implementation of an Error! Reference source not found. may be stored on or transmitted across some form of computer readable media. Computer readable media may be any available media that may be accessed by a computer. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

"Communication media" typically embody computer readable instructions, data structures, program modules, or other data in a modulated data signal, such as carrier wave or other transport mechanism. Communication media also include any information delivery media.

The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Conclusion

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A computer-readable storage medium having computer-executable instructions that, when executed, direct a computer to perform a method comprising:
    obtaining a message M;
    defining a vector v to be $v_1, \ldots, v_n$ based upon a predefined first hashing function of the message M;
    calculating a private key $\alpha$ in accordance with this equation
    $$\alpha = \sum_{i=1}^{n} v_i \alpha_i \bmod m,$$
    where m is an order of torsion points, $\alpha_i$ are scaling factors in $Q_i = \alpha_i P$ ($1 \leq i \leq n$), and P and $Q_i$ are elliptical curve points;
    producing a signature S in accordance with this equation: $S = \alpha H_2(M)$, where $H_2(M)$ is a predefined second hashing function of the message M, wherein the predefined first hashing function differs from the predefined second hashing function and wherein the signature S is represented by a number of bits;
    truncating a specific number of bits off of signature S;
    after the truncating, indicating a message-and-signature pair (M, S) based, at least in part, on the obtaining, defining, calculating, or producing.

2. A medium as recited in claim 1, wherein the results of the indicating comprises a message-and-signature pair (M, µS) and the method further comprises calculating $\mu = H_3(BK, M)$, where BK is key and $H_3(BK, M)$ maps M into an integer within a defined range.

3. A medium as recited in claim 1, wherein the $\alpha_i$ are scaling factors for n discrete logs of $\alpha_1 P, \ldots, \alpha_n P$ base P, where n is a positive integer, P is a point on an elliptic curve and a public key.

4. A medium as recited in claim 1, wherein
    $\alpha_i$ are scaling factors for n discrete logs of $\alpha_1 P, \ldots, \alpha_n P$ base P, where n is a positive integer, wherein P is a point on an elliptic curve;
    a point P is of order m and where $e_m(P,Q):E[m] \times E[m] \to GF(q)^*$ denotes a Tate or Weil or Squared Tate or Squared Weil Pairing, where $\alpha_1 P, \ldots, \alpha_n P = Q_1, \ldots, Q_n$ and where q is a prime power.

5. A medium as recited in claim 1, wherein the first hashing function produces values in $\{\pm 1\}$.

6. A computing device comprising:
    an output device;
    a medium as recited in claim 1.

7. A computer-readable storage medium having computer-executable instructions that, when executed, direct a computer to perform a method for facilitating enhanced security of a computing system without increasing a length of the short digital cipher, the method comprising:
    choosing n discrete logs of $\alpha_1 P, \ldots, \alpha_n P$ base P, where n is a positive integer, P is a point on an elliptic curve and a public key, and $\alpha_i$ is a scaling factor and a private key;
    indicating results of the choosing;
    forging one or more short digital ciphers based upon the indicated results of the choosing, whereby the forging enhances security of a computing system without increasing a length of the short digital cipher.

8. A medium as recited in claim 7, wherein a point P is of order m and where $e_m(P,Q):E[m] \times E[m] \to GF(q)^*$ denotes a Tate or Weil or Squared Tate or Squared Weil Pairing, where $\alpha_1 P, \ldots, \alpha_n P = Q_1, \ldots Q_n$ and where q is a prime power.

9. A medium as recited in claim 7 further comprising generating a digital signature based upon a message M and $\alpha_i$.

10. A computing device comprising:
    an output device;
    a medium as recited in claim 7.

11. A method facilitating the production of a digital signature, the method comprising:
    obtaining a message M;
    defining a vector v to be $v_1, \ldots, v_n$ based upon a predefined first hashing function of the message;

calculating a private key α in accordance with this equation $$\alpha = \sum_{i=1}^{n} v_i \alpha_i \bmod m$$

where m is an order of torsion points, $\alpha_i$ are scaling factors in $Q_i = \alpha_i P$ ($1 \leq i \leq n$) and P and $Q_i$ are elliptical curve points;
  producing a signature S in accordance with this equation: $S = \alpha H_2(M)$, where $H_2(M)$ is a predefined second hashing function of the message;
  indicating results based, at least in part, on the obtaining, defining, calculating, or producing.

12. A method as recited in claim 11 wherein the results of the indicating comprises a message-and-signature pair (M, S).

13. A method as recited in claim 11, wherein the results of the indicating comprises a message-and-signature pair (M, μS) and the method further comprises calculating $\mu = H_3(BK, M)$, where BK is key and $H_3(BK, M)$ maps M into an integer within a defined range.

14. A method as recited in claim 11, wherein the $\alpha_i$ are scaling factors for n discrete logs of $\alpha_1 P, \ldots, \alpha_n P$ base P, where n is a positive integer, P is a point on an elliptic curve and a public key.

15. A method as recited in claim 11, wherein
  $\alpha_i$ are scaling factors for n discrete logs of $\alpha_1 P, \ldots, \alpha_n P$ base P, where
  n is a positive integer, P is a point on an elliptic curve;
  a point P is of order m and where $e_m(P,Q):E[m] \times E[m] \to GF(q)^*$ denotes a Tate or Weil or Squared Tate or Squared Weil Pairing, where $\alpha_1 P, \ldots, \alpha_n P = Q_1, \ldots, Q_n$ and where q is a prime power.

16. A method as recited in claim 11, wherein the signature S is represented by a number of bits, wherein the method further comprises truncating a specific number of bits off of S before the indicating.

17. A method as recited in claim 11, wherein the first hashing function produces values in $\{\pm 1\}$.

18. A computer-readable storage medium having computer-executable instructions that, when executed, direct a computer to perform a method comprising:
  obtaining an input message-and-signature pair (M, S);
  defining a vector v to be $v_1, \ldots v_n$ based upon a predefined first hashing function of the message;
  calculating a point Q on an elliptic curve in accordance with this equation:

$$Q = \sum_{i=1}^{n} v_i Q_i;$$

comparing pairing outputs of a pair (P, S) and a pair (Q, $H_2(M)$), where $H_2(M)$ is a predefined second hashing function of M and P is a point on the elliptic curve;
  indicating results of the comparing.

19. A medium as recited in claim 18 further comprising verifying the input message-and-signature pair (M, S) when the indicated results of the comparing is a match.

20. A medium as recited in claim 18, wherein:
  the point P being a point on an elliptic curve and of order m and where $e_m(P,Q):E[m] \times E[m] \to GF(q)^*$ denotes a Tate or Weil or Squared Tate or Squared Weil Pairing, where $\alpha_1 P, \ldots \alpha_n P = Q_1, \ldots, Q_n$ and where q is a prime power;
  the $\alpha_i$ being scaling factors for n discrete logs of $\alpha_1 P, \ldots, \alpha_n P$ base P, where n is a positive integer.

21. A medium as recited in claim 18, wherein the method further comprises, when the indicated results of the comparing is not a match, modifying the vector v relative to its previous definition and repeating the defining, calculating, and comparing.

22. A medium as recited in claim 18, wherein the method further comprises:
  when the indicated results of the comparing is not indicate a match, modifying the vector v relative to its previous definition;
  repeating the defining, calculating, and comparing;
  if the indicated results of the comparing still does not a match, then repeating the modifying and the repeating of the defining, calculating, and comparing until the indicated results do match.

23. A medium as recited in claim 18, wherein the method further comprises when the indicated results of the comparing is not a match, repeating the defining, calculating, and comparing with the defining being based upon a predefined third hashing function of the message.

24. A medium as recited in claim 18, wherein the signature S is represented by a number of bits, wherein the method further comprises padding S with a specific number of bits before the defining.

25. A computing device comprising:
  an output device;
  a medium as recited in claim 18.

26. A method facilitating the verification of a digital short-signature, the method comprising:
  obtaining, by a short-signature verifier configured to verify a valid digital short signature, an input message-and-signature pair (M, S);
  defining, by the short-signature verifier, a vector v to be $v_1, \ldots, v_n$ based upon a predefined first hashing function of the message;
  calculating, by the short-signature verifier, a point Q on an elliptic curve in accordance with this equation:

$$Q = \sum_{i=1}^{n} v_i Q_i;$$

comparing, by the short-signature verifier, pairing outputs of a pair (P, S) and a pair (Q, $H_2(M)$), where $H_2(M)$ is a predefined second hashing function of M and P is a point on the elliptic curve;
  indicating, by the short-signature verifier, results of the comparing.

27. A method as recited in claim 26 further comprising verifying the input message-and-signature pair (M, S) when the indicated results of the comparing is a match.

28. A method as recited in claim 26, wherein
  the point P being a point on an elliptic curve and of order m and where $e_m(P,Q):E[m] \times E[m] \to GF(q)^*$ denotes a Tate or Weil or Squared Tate or Squared Weil Pairing, where $\alpha_1 P, \ldots, \alpha_n P = Q_1, \ldots, Q_n$ and where q is a prime power;
  the $\alpha_i$ being scaling factors for n discrete logs of $\alpha_1 P, \ldots, \alpha_n P$ base P, where n is a positive integer.

29. A method as recited in claim 26 further comprising, when the indicated results of the comparing is not a match, modifying the vector v relative to its previous definition and repeating the defining, calculating, and comparing.

30. A method as recited in claim 26 further comprising:
  when the indicated results of the comparing is not a match, modifying the vector v relative to its previous definition;
  repeating the defining, calculating, and comparing;

if the indicated results of the comparing still does not a match, then repeating the modifying and the repeating of the defining, calculating, and comparing until the indicated results do match.

31. A method as recited in claim 26 further comprising when the indicated results of the comparing is not a match, repeating the defining, calculating, and comparing with the defining being based upon a predefined third hashing function of the message.

32. A method as recited in claim 26, wherein the signature S is represented by a number of bits, wherein the method further comprises padding S with a specific number of bits before the defining.

33. A computer-readable storage medium having computer-executable instructions that, when executed, direct a computer to perform a method comprising:

obtaining an input message-and-signature pair (M, S');

defining a vector v to be $v_1, \ldots, v_n$ based upon a predefined first hashing function of the message;

calculating a point Q on an elliptic curve in accordance with this equation:

$$Q = \sum_{i=1}^{n} v_i Q_i;$$

comparing pairing outputs of a pair (P, S') and a pair (Q, $H_2(M)O^\mu$, where $H_2(M)$ is a predefined second hashing function of M and P is a point on the elliptic curve and $\mu$ is an integer in a defined range;

indicating results of the comparing.

34. A medium as recited in claim 33 further comprising verifying the input message-and-signature pair (M, S') when the indicated results of the comparing is a match.

35. A computing device comprising:

an output device;

a medium as recited in claim 33.

* * * * *